(12) United States Patent
Wang et al.

(10) Patent No.: US 9,321,458 B2
(45) Date of Patent: Apr. 26, 2016

(54) SLIDING MODE TRAJECTORY VOTING STRATEGY MODULE AND DRIVING CONTROL SYSTEM AND METHOD THEREOF

(71) Applicant: Automotive Research & Testing Center, Changhua County (TW)

(72) Inventors: Tong-Wen Wang, Changhua County (TW); Wei-Feng Hsu, Changhua County (TW); Po-Kai Tseng, Changhua County (TW)

(73) Assignee: Automotive Research & Testing Center, Changhua County (TW)

( * ) Notice: Subject to any disclaimer, the term of this patent is extended or adjusted under 35 U.S.C. 154(b) by 178 days.

(21) Appl. No.: 14/108,355

(22) Filed: Dec. 17, 2013

(65) Prior Publication Data

US 2015/0166061 A1 Jun. 18, 2015

(51) Int. Cl.
*G06N 7/02* (2006.01)
*B60W 30/02* (2012.01)

(52) U.S. Cl.
CPC ........... *B60W 30/02* (2013.01); *B60W 2540/30* (2013.01); *B60W 2550/14* (2013.01); *B60W 2550/146* (2013.01)

(58) Field of Classification Search
CPC ................. B60W 2550/00; B60W 2550/10; B60W 2550/14; B60W 2550/146; G06N 7/02; Y10S 706/90; G05B 2119/39232; G05B 2119/42346
USPC ......... 701/23, 25, 26, 27, 410, 411, 416, 423, 701/533, 519, 301, 41, 44, 117
See application file for complete search history.

(56) References Cited

U.S. PATENT DOCUMENTS

| 5,983,161 | A | * | 11/1999 | Lemelson | G01S 19/11 340/436 |
| 7,610,123 | B2 | * | 10/2009 | Han | G01C 21/28 701/14 |
| 2002/0106108 | A1 | * | 8/2002 | Benson | A01B 69/001 382/104 |
| 2004/0064229 | A1 | * | 4/2004 | Stout | B62D 6/002 701/44 |
| 2004/0088093 | A1 | * | 5/2004 | Yao | B62D 6/008 701/44 |
| 2005/0278095 | A1 | | 12/2005 | Taliwal | |
| 2006/0089800 | A1 | | 4/2006 | Svendsen et al. | |
| 2006/0214817 | A1 | * | 9/2006 | Appl | G01C 21/3632 340/995.19 |

(Continued)

FOREIGN PATENT DOCUMENTS

TW I228086 2/2005
TW I309612 5/2009

(Continued)

OTHER PUBLICATIONS

Huan et al., Steering control strategy guide by two preview vision cues, Jul. 10, 2012, Science China.*

*Primary Examiner* — Thomas G Black
*Assistant Examiner* — Sara Lewandroski
(74) *Attorney, Agent, or Firm* — CKC & Partners Co., Ltd.

(57) ABSTRACT

The present invention provided a sliding mode trajectory voting strategy module. The sliding mode trajectory voting strategy module integrates a reaction time and a relative distance into an obstacle feature sliding surface by utilize sliding mode control theory, and calculates the obstacle feature sliding surface and a road curvature value in combination with fuzzy theory to obtain an orientation angle of a safety path.

4 Claims, 5 Drawing Sheets

(56) References Cited

U.S. PATENT DOCUMENTS

| | | | |
|---|---|---|---|
| 2008/0195282 A1* | 8/2008 | Norris | G05D 1/0278 701/44 |
| 2009/0018723 A1 | 1/2009 | Chevion et al. | |
| 2009/0276111 A1 | 11/2009 | Wang et al. | |
| 2010/0098290 A1 | 4/2010 | Zhang et al. | |
| 2010/0191421 A1 | 7/2010 | Nilsson | |
| 2010/0256836 A1 | 10/2010 | Mudalige | |
| 2010/0324771 A1 | 12/2010 | Yabushita et al. | |
| 2012/0083963 A1 | 4/2012 | Sato et al. | |
| 2012/0109423 A1 | 5/2012 | Pack et al. | |
| 2012/0158247 A1 | 6/2012 | Norris et al. | |
| 2012/0232739 A1 | 9/2012 | Takahashi et al. | |

FOREIGN PATENT DOCUMENTS

| | | |
|---|---|---|
| TW | I315704 | 10/2009 |
| TW | I368581 | 7/2012 |

\* cited by examiner

SLIDING MODE TRAJECTORY VOTING STRATEGY MODULE AND DRIVING CONTROL SYSTEM AND METHOD THEREOF

BACKGROUND

1. Field of Invention

The present invention relates to a driving control system. More particularly, the present invention relates to a sliding mode trajectory voting strategy module and a driving control system and a method thereof.

2. Description of Related Art

With the development of vehicle related technology, more and more vehicle safety issues emerge. Consequently, people take great care about driving safety. Together with strict laws and regulations and appeals by relevant reports to the public, vehicle safety has currently become the most important subject in vehicle related technology research.

In the initial development stage of vehicle safety technology, passive assist devices, such as air bags, seat belts, cervical spine protection seats and bumpers, are generally utilized to reduce accident casualties by means of safeguarding or fastening. However, active assist devices being able to react before accidents occur, such as anti-lock braking systems (ABS), electronic stability program systems (ESPS), traction control systems (TCS), etc., are obviously more important than the passive assist devices since they can be actuated to take instant control of cars before car collisions or stalling.

Currently, the solution is focused on integrating electronics and information technology and sensing technology. Not only are environmental road conditions detected in a real time manner, but drivers are also assisted by analysis and judgment technologies. In addition, automatic control technology may be further integrated to control cars so that remote driving and automatic driving places can even be achieved in the future.

SUMMARY

Therefore, it is an objective of the present invention to provide a sliding mode trajectory voting strategy module and a driving control system and a method thereof so as to achieve a high-security intelligent driving control system.

According to one experiment embodiment of the present invention, a sliding mode trajectory voting strategy module comprises a fuzzification interface, a fuzzy inference interface, and a defuzzification interface. The fuzzification interface inputs a road curvature information and a road risk assessment information and performs a fuzzy analysis based on a plurality of predetermined membership functions. The fuzzy inference interface integrates the road curvature information and the road risk assessment information based on a sliding mode control theory and performs a simulation on the road curvature information and the road risk assessment information to obtain a route voting result. The defuzzification interface defuzzifies the route voting result according to a fuzzy logic rule table to obtain an orientation angle of a safe path.

In the foregoing, the sliding mode control theory is utilized to integrate a reaction time and a relative distance in the road curvature information and the road risk assessment information into an obstacle feature sliding surface. The obstacle feature sliding surface $S_r = \text{sign}(Y_t)(\tau_r + \lambda d_r)$, wherein $\tau$ represents the reaction time, $\lambda$ represents an obstacle feature constant, d represents the relative distance, Y represents a horizontal coordinate of a target obstacle, and the subscript i represents the target obstacle. The reaction time may be a time spent on avoiding an obstacle by a driver or a time spent on responding to the route voting result by the target vehicle. The fuzzy inference interface uses a road curvature value and the obstacle feature sliding surface as antecedents of a fuzzy rule, and uses the orientation angle of the safe path as consequent of the fuzzy rule. The road curvature value $K = 1/r$, wherein r is a curvature radius of a road. The road curvature information comprises a lateral motion and a longitudinal motion of the target vehicle. The road risk assessment information comprises an obstacle feature, a road feature, and a human-vehicle interaction feature. Each of the predetermined membership functions is a triangle equation to perform classification.

According to another experiment embodiment of the present invention, a sliding mode driving control system comprises an environmental numerical information sensor fusion unit, a driving behavior detection unit, a road curvature generating unit, a road risk assessment unit, a trajectory voting strategy unit driving behavior command, and an onboard unit. The environmental numerical information sensor fusion unit acquires a number of external environmental numerical values and a number of internal numerical values for a target vehicle. The driving behavior detection unit acquires interference data for vehicle driving behavior. The road curvature generating unit receives the external environmental numerical values and the internal numerical values to generate road curvature information. The road risk assessment unit receives the interference data for vehicle driving behavior, the external environmental numerical values and the internal numerical values to obtain road risk assessment information. The trajectory voting strategy unit performs analysis and judgment to the road risk assessment information and the road curvature information and performs calculations to obtain an orientation angle of a safe path based on a road curvature value and an obstacle feature sliding surface. The driving behavior command generating unit outputs a driver behavior command by employing the orientation angle of the safe path. The onboard unit automatically controls the target vehicle in accordance with the driver behavior command.

In the foregoing, the obstacle feature sliding surface is formed by integrating a reaction time and a relative distance by using sliding mode control theory. The obstacle feature sliding surface $S_r = \text{sign}(Y_t)(\tau_r + \lambda d_r)$, wherein $\tau$ represents the action time, $\gamma$ represents an obstacle feature constant, d represents the relative distance, Y represents a horizontal coordinate of a target obstacle, and the subscript i represents the target obstacle. The reaction time may be a time spent on avoiding an obstacle by a driver or a time spent on responding to the driver behavior command by the target vehicle. The trajectory voting strategy unit uses a fuzzy calculation analysis method. The trajectory voting strategy unit uses a road curvature value and the obstacle feature sliding surface as antecedents of a fuzzy rule, and uses the orientation angle of the safe path as a consequent of the fuzzy rule. The road curvature value $K = 1/r$, wherein r is a curvature radius of a road. The road curvature information comprises lateral motion and longitudinal motion of the target vehicle. The road risk assessment information comprises an obstacle feature, a map road feature, a human-vehicle interaction feature, and a driving rule feature. The sliding mode driving control system further stores the external environmental numerical values, the internal numerical values, the interference data for vehicle driving behavior, the road curvature information, and the road risk, assessment information.

According to still another experiment embodiment of the present invention, a sliding mode driving control method comprises the following steps: acquiring a number of external environmental numerical values, a number of internal numerical values, and an interference data for vehicle driving behavior; generating a road curvature information by utilizing the external environmental numerical values and the internal numerical values; obtaining a road risk assessment information by utilizing the interference data for vehicle driving behavior, the external environmental numerical values, and the internal numerical values; performing analysis and judgment to the road risk assessment information and the road curvature information by a trajectory voting strategy unit and obtaining an orientation angle of a safe path based on a road curvature value and an obstacle feature sliding surface; and outputting a driver behavior command by employing the orientation angle of the safe path and controlling the target vehicle in accordance with the driver behavior command.

In the foregoing, the obstacle feature sliding surface is formed by integrating a reaction time and a relative distance by using sliding mode control theory. The obstacle feature sliding surface $S_i = \text{sign}(Y_i)(\tau_i + \lambda d_i)$, wherein $\tau$ represents the reaction time, $\lambda$ represents an obstacle feature constant, d represents the relative distance, Y represents a horizontal coordinate of a target obstacle, and the subscript i represents the target obstacle. The reaction time may be a time spent on avoiding an obstacle by a driver or a time spent on responding to the driver behavior command by the target vehicle. The trajectory voting strategy unit uses a fuzzy calculation analysis method. The trajectory voting strategy unit uses a road curvature value and the obstacle feature sliding surface as antecedents of a fuzzy rule, and uses the orientation angle of the safe path as a consequent of the fuzzy rule. The road curvature value $K=1/r$, wherein r is a curvature radius of a road. The road curvature information comprises lateral motion and longitudinal motion of the target vehicle. The road risk assessment information comprises an obstacle feature, a map road feature, a human-vehicle interaction feature, and a driving rule feature. The sliding mode driving control method further comprises the step of storing the external environmental numerical values, the internal numerical values, the interference data for vehicle driving behavior, the road curvature information, and the road risk assessment information in a real-time manner.

In the present invention sliding mode trajectory voting strategy module and the driving control system and the method thereof, the environmental numerical information sensor fusion unit is utilized to detect monitoring conditions, such as the bodywork signal, the road conditions, the obstacle information, or the driving conditions, so as to collect data. The trajectory voting strategy unit then performs analysis and calculation to provide the orientation angle of the safe path. In this manner, either a vehicle movement in a straight line or a turning movement of a vehicle can be processed by using sliding mode control theory to acquire the optimal driving path so that the vehicle is allowed to be controlled in accordance with the driver behavior command by the onboard unit.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DESCRIPTION OF THE EMBODIMENTS

Figure 1:
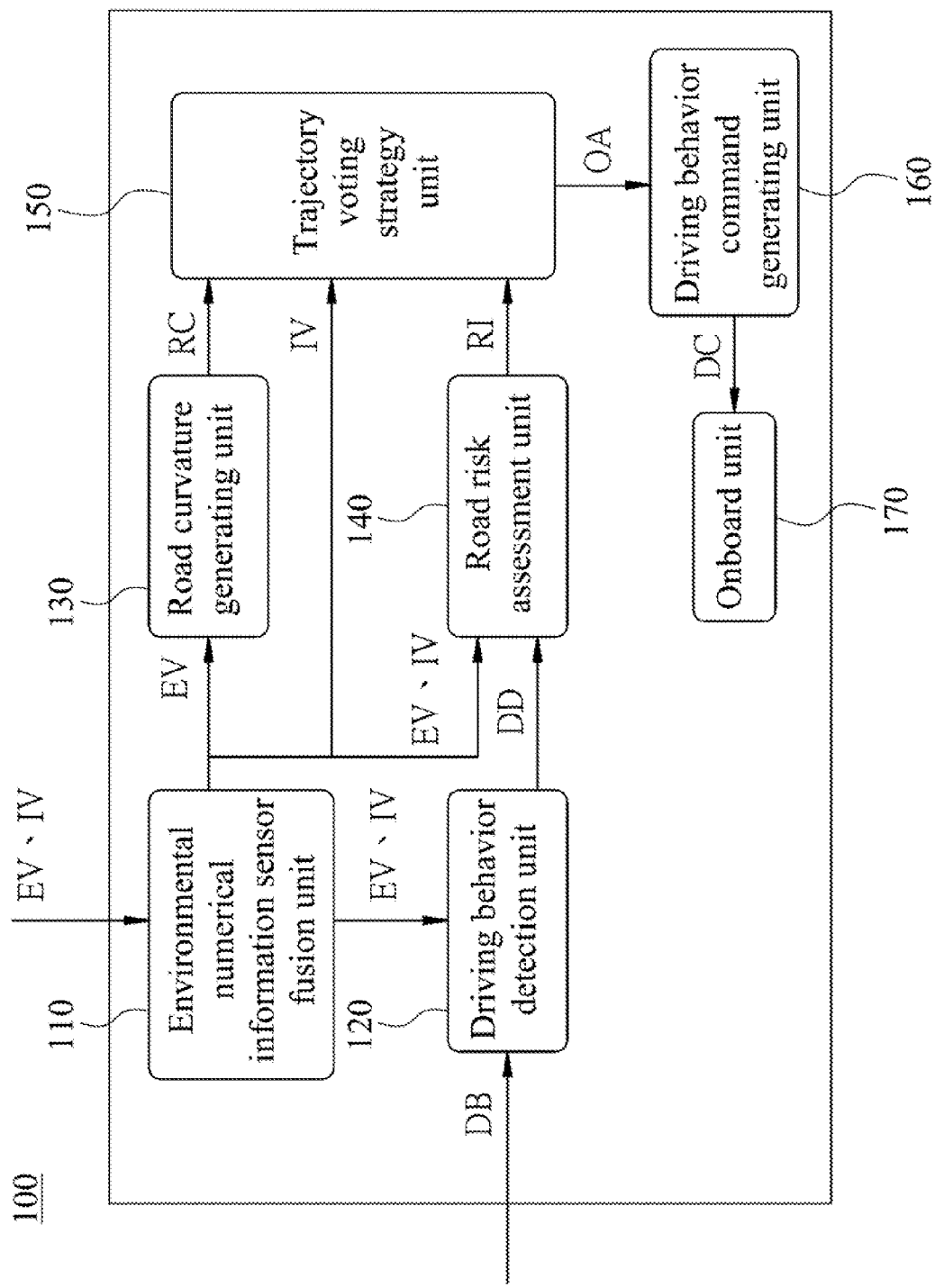
FIG. 1 depicts a block diagram of sliding mode driving control system according to one embodiment of this invention.

Reference will now be made in detail to the present embodiments of the invention, examples of which are illustrated in the accompanying drawings. Wherever possible, the same reference numbers are used in the drawings and the description to refer to the same or like parts.

Figure 2:
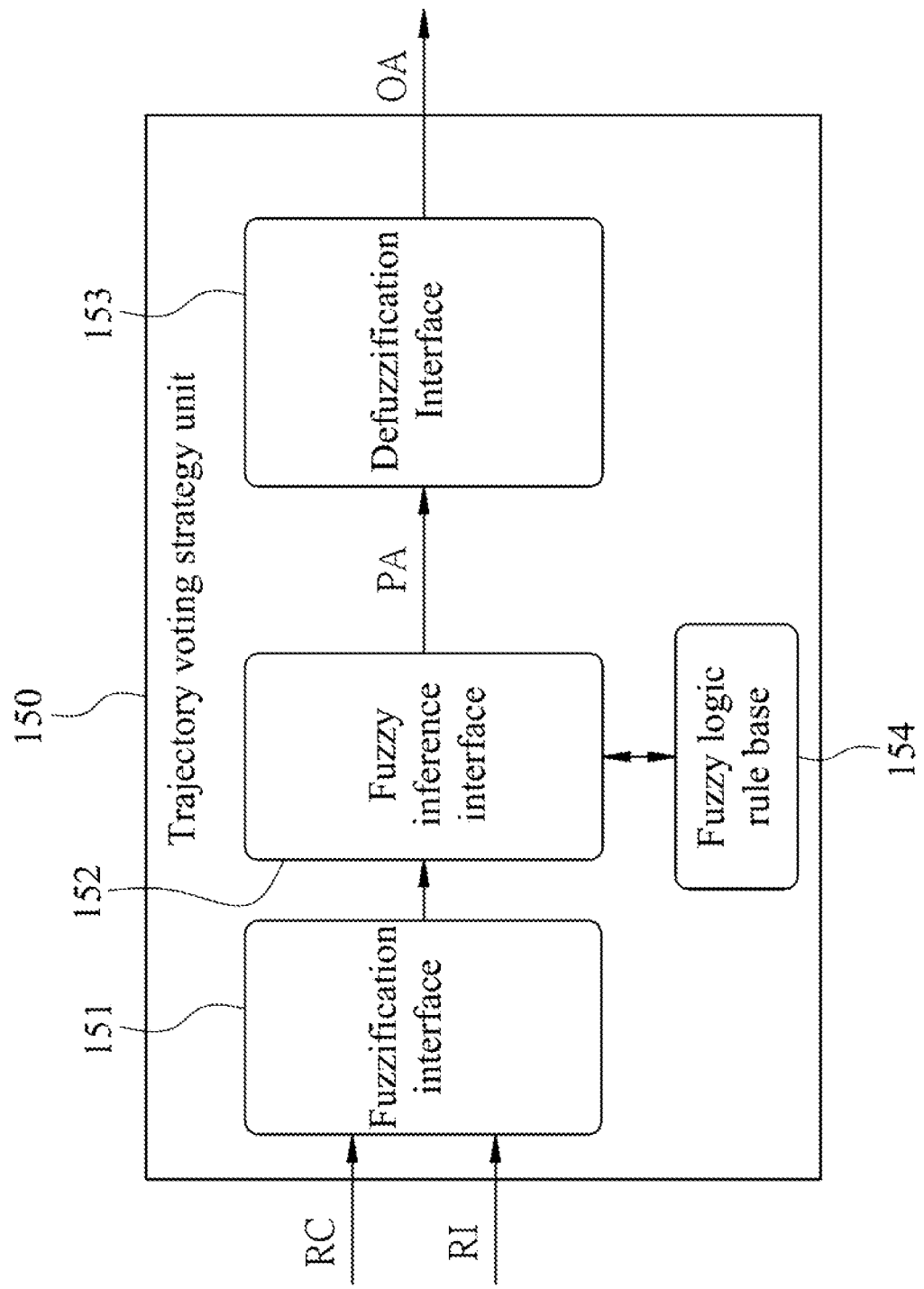
FIG. 2 depicts a schematic diagram of a sliding mode trajectory voting strategy unit according to one embodiment of this invention.

FIG. 1 depicts a block diagram of a sliding mode driving control system according to one embodiment of this invention. FIG. 2 depicts a schematic diagram of a sliding mode trajectory voting strategy unit according to one embodiment of this invention. A sliding mode driving control system 100 comprises an environmental numerical information sensor fusion unit 110, a driving behavior detection unit 120, a road curvature generating unit 130, a road risk assessment unit 140, a trajectory voting strategy unit 150, a driving behavior command generating unit 160, and an onboard unit 170.

The environmental numerical information sensor fusion unit 110 acquires a number of external environmental numerical values EV and a number of internal numerical values IV for a target vehicle. The external environmental numerical values EV and the internal numerical values IV may be, for example, identification information for surroundings and obstacles detected by a laser radar (Ladar), an optical radar (Lidar), or a camera, positioning information detected by a global positioning system (GPS), or dynamic information for the target vehicle detected by an inertial sensing unit, etc. The inertial sensing unit may be a triaxial accelerometer, a gyroscope, an electronic compass, etc. The environmental numerical information sensor fusion unit 110 fuses data from the above sensing units or detection units for the purpose of subsequent analysis and judgment.

The driving behavior detection unit 120 not only receives a numerical value detected by the environmental numerical information sensor fusion unit 110, but also acquires a current numerical value for controlling the target vehicle behavior DB and integrate them into interference data for vehicle driving behavior DO. All numerical values acquired by the driving behavior detection unit 120, such as a distance between a vehicle and an obstacle, identification of lane, an angle between a lane and a driving direction of a vehicle, friction damping between a vehicle and a road surface, an inertia of a vehicle, a center of gravity of a vehicle, and a current degree of throttle being pressed a steering wheel angle, a current degree of brake being stepped on, and a tire model of the target vehicle, etc., will affect subsequent vehicle driving behaviors.

The road curvature generating unit 130 receives the external environmental numerical values EV transmitted from the environmental numerical information sensor fusion unit 110 and calculates a road curvature information RC. The road curvature information RC is actually the magnitude of curvature of a road traveled by the target vehicle. It is noted that the road curvature information RC is calculated from the numerical value detected by the environmental numerical information sensor fusion unit 110 in combination with map information.

The road risk assessment unit 140 receives the interference data for vehicle driving behavior DD transmitted from the driving behavior detection unit 120, and the external environmental numerical values EV and the internal numerical values IV transmitted form the environmental numerical information sensor fusion unit 110 to obtain a road risk assessment information RI. A calculation of the road risk assessment information RI involves considering an obstacle feature, a road feature, and a human-vehicle interaction feature. The road risk assessment information RI is a risk which may arise from obstacle avoidance or driving through a road surface with an obstacle based on features of pedestrians, animals, or standing water on the road, a feature of road surface, or features of the other obstacles.

The trajectory voting strategy unit 150 performs judgment and analysis based on the road risk assessment information RI transmitted from the road risk assessment unit 140 and the road curvature information RC transmitted from the road curvature generating unit 130. The trajectory voting strategy unit 150 uses lateral motion of the target vehicle to calculate a curvature of a feasible route by a method using a Clothoid curve. The trajectory voting strategy unit 150 also uses longitudinal motion of the target vehicle to perform calculations so as to generate an optimal orientation angle of a safe path OA passable by the target vehicle when considering the dynamic model and tire model of the target vehicle and a friction coefficient of the road surface to be the physical limitations of a smooth and slow turn.

The driving behavior command-generating unit 160 receives the orientation angle of the safe path OA passable by the target vehicle transmitted from the trajectory voting strategy unit 150, and outputs a driver behavior command DC.

The onboard unit 170 automatically controls the target vehicle in accordance with the driver behavior command DC transmitted from the driving behavior command generating unit 160. The onboard unit 170 is configured to control the driving behaviors of the target vehicle, such as to control the throttle, the brake, or the electric power steering (EPS), etc.

In the present embodiment, fuzzy control theory is employed to create a judgment and analysis tool of the trajectory voting strategy unit 150. The trajectory voting strategy unit 150 comprises a fuzzification interface 151, a fuzzy inference interface 152, a defuzzification interface 153, and a fuzzy logic rule base 154. The fuzzification interface 151 inputs the road curvature information RC and the road risk assessment information RI to perform a fuzzy classification analysis according to a plurality of predetermined membership functions. The fuzzy inference interface 152 integrates the road curvature information RC and the road risk assessment information RI based on sliding mode control theory, and performs a simulation on the road curvature information RC and the road risk assessment information RI so as to obtain a route voting result PA. The defuzzification interface 153 defuzzifies the route voting result PA using a fuzzy logic rule table in the fuzzy logic rule base 154 so as to obtain the orientation angle of the safe path OA passable by the target vehicle.

Figure 3:
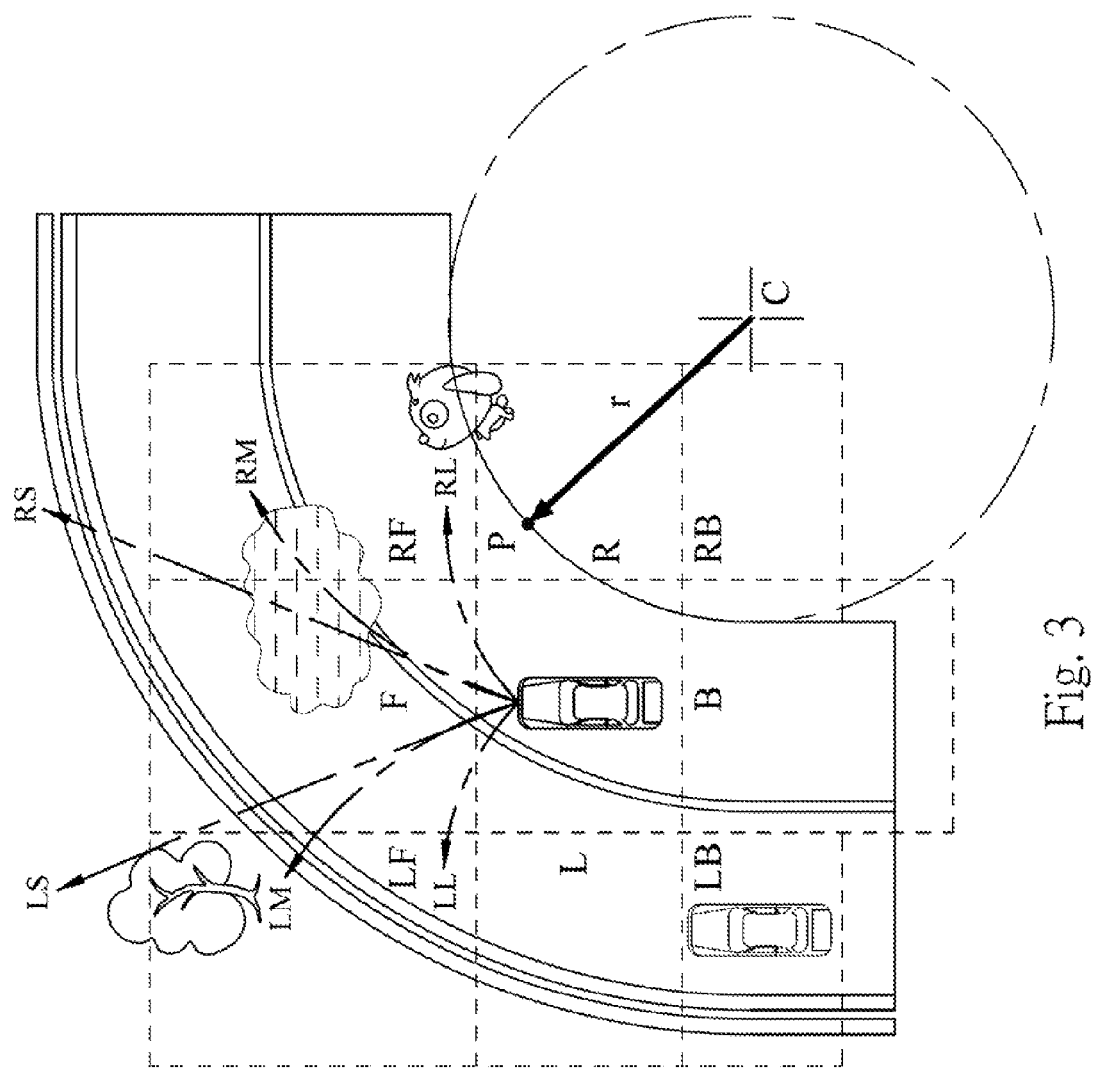
FIG. 3 depicts a schematic diagram showing a judgment performed by the sliding mode driving control system in FIG. 1.
Figure 4A:
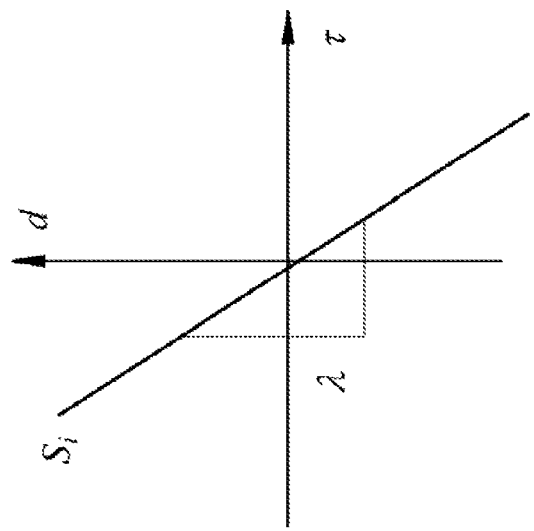
FIG. 4A depicts a schematic diagram showing a sliding condition of the sliding mode trajectory voting strategy unit in FIG. 2.
Figure 4B:
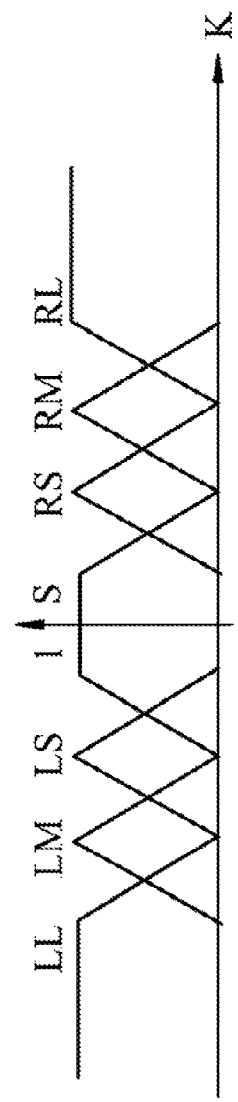
FIG. 4B depicts a membership function of a road curvature in the sliding mode trajectory voting strategy unit in FIG. 2.
Figure 4C:
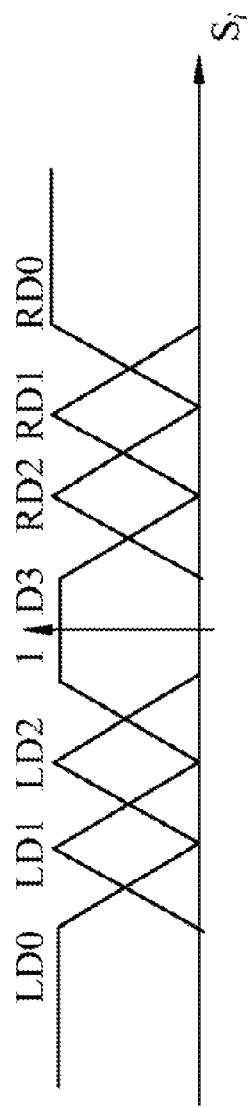
FIG. 4C depicts a membership function of an obstacle feature sliding surface in the sliding mode trajectory voting strategy unit in FIG. 2.

Since principle of the above-mentioned fuzzy algorithm is well known to those of ordinary skill in the art, a description in this regard is not provided. Ire the present embodiment, only the fuzzy algorithm process and various parameters serve as an example for explanation of aspects of the present invention. FIG. 3 depicts a schematic diagram showing a judgment performed by the sliding mode driving control system in FIG. 1. FIG. 4A depicts a schematic diagram showing a sliding condition of the sliding mode trajectory voting strategy unit in FIG. 2. FIG. 4B depicts a membership function of a road curvature in the sliding mode trajectory voting strategy unit in FIG. 2. FIG. 4C depicts a membership function of an obstacle feature sliding surface in the sliding mode trajectory voting strategy unit in FIG. 2. FIG. 40 depicts a schematic diagram of an orientation angle of a safe path determined by the sliding mode trajectory voting strategy unit in FIG. 2.

As shown in FIG. 3, the target vehicle is driven on a road. There is an obstacle in front of the target vehicle, and another vehicle at rear left of the target vehicle. A peripheral region of the target vehicle is divided into a plurality of regions, respectively marked as LB, L, LF, F, B, RB, R, RF, by using the external environmental numerical values EV detected by the environmental numerical information sensor fusion unit 110. First, the environmental numerical information sensor fusion unit 110 and the driving behavior detection unit 120 of the sliding mode driving control system 100 receives the external environmental numerical values EV and the internal numerical values IV of the target vehicle, and the numerical value for controlling the target vehicle behavior DB and transmits the external environmental numerical values EV, the internal numerical values IV, and the interference data for vehicle driving behavior DD to the road curvature generating unit 130 and the road risk assessment unit 140 to respectively generate the road curvature information RC and the road risk assessment information RI. The trajectory voting strategy unit 150 receives both the road curvature information RC and the road risk assessment information RI and calculates the optimal orientation angle of the safe path OA passable by the target vehicle by fuzzy analysis. The driving behavior command generating unit 160 thus controls the actuation of the onboard unit 170 to allow the target vehicle to travel at the orientation angle of the safe path OA.

According to the present embodiment, the sliding mode driving control system 100 may further back up the information or numerical values transmitted between the environmental numerical information sensor fusion nit 110, the driving behavior detection unit 120, the road curvature generating unit 130, the road risk assessment unit 140, the trajectory voting strategy unit 150, and the driving behavior command generating unit 160 and performs a recollection action in conjunction with routes on a map.

The trajectory voting strategy unit 150 calculates the optimal orientation angle of the safe path OA passable by the target vehicle from parameters including a road curvature value K, a reaction time $\tau$, and a relative distance d. When considering three input parameters and one output parameter, the fuzzy inference interface 152 must be set to have three antecedents and one consequent. Under the circumstances, the trajectory voting strategy unit 150 must set up a huge number of rules to carry out the calculations. Therefore, sliding mode control theory is utilized to reduce overall architecture. That is, to correlate system conditions of the sliding mode driving control system 100 with a sliding surface which is formed by integrating the reaction time and the relative distance d. As just mentioned, the reaction time $\tau$ and the relative distance d are thus integrated into an obstacle feature sliding surface $S_i$ (see FIG. 4A), and $S_i = \text{sign}(Y_i)(\tau_i + \lambda d_i)$, wherein $Y_i$ represents a horizontal coordinate of a target obstacle, the subscript i represents the target obstacle, and represents an obstacle feature constant. In this manner, the trajectory voting strategy unit 150 is allowed to perform calculations by using only two antecedents, namely, the road curvature value K and the obstacle feature sliding surface $S_i$. The road curvature value K is equal to 1/r and r is a curvature radius of a road as derived from the curvature calculation method for plane curves. This is because that the magnitude of a curvature at a point P on a road is equal to the reciprocal of a radius of an osculating circle, and the radius of the osculating circle is the curvature radius of the road r and point C is the center of the osculating circle (see FIG. 3). The smaller the road curvature value K is, the straighter the path is. The smaller the value for the obstacle feature sliding surface $S_i$ is, the more dangerous it is to drive.

Figure 4D:
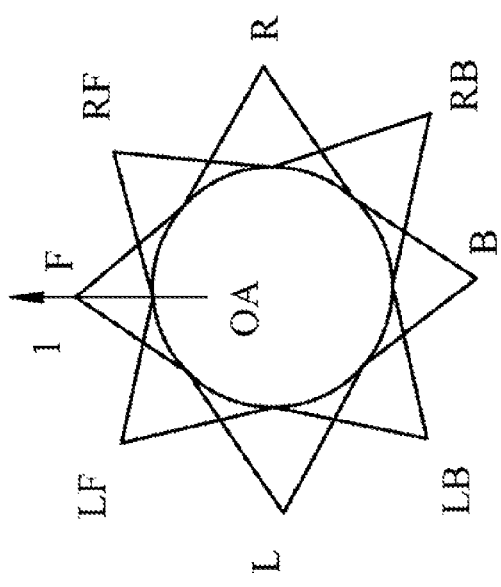
FIG. 4D depicts a schematic diagram of an orientation angle of a safe path determined by the sliding mode trajectory voting strategy unit in FIG. 2.

The triangle equation serves as the membership functions of the road curvature value K and the obstacle feature sliding surface $S_i$ (see FIG. 4B and FIG. 4C). The road curvature value K is represented by LL. LM. LS, S, RS, RM and RL which are fuzzy variables, and the obstacle feature sliding surface $S_i$ is represented by LD0, LD1, LD2, LD3, D3, RD2, RD1, and RD0 which are fuzzy variables (see FIG. 4C). Finally, a fuzzy logic rule table is created by using the road curvature value K and the obstacle feature sliding surface $S_i$ to find out the route voting result PA correspondingly and calculate the orientation angle of the safe path OA (see FIG. 4D). The fuzzy logic rule table is as follows:

|       | K   |    |    |    |    |    |    |
| ---   | --- | ---| ---| ---| ---| ---| ---|
| $S_i$ | LL  | LM | LS | S  | RS | RM | RL |
| LD0   | RF  | RF | F  | RF | RF | F  | R  |
| LD1   | R   | R  | RF | R  | R  | R  | RB |
| LD2   | RB  | R  | R  | RB | RB | RB | RB |
| D3    | B   | B  | B  | B  | B  | B  | B  |
| RD2   | LB  | LB | LB | LB | L  | L  | LB |
| RD1   | LB  | L  | L  | L  | LF | L  | L  |
| RD0   | L   | F  | LF | LF | F  | LF | LF |

With additional reference to FIG. 3, the calculation performed by the trajectory voting strategy unit 150 must be based on all the obstacle information, road feature, driving behavior, and dynamic information for the target vehicle. For example, when the obstacle feature sliding surface $S_i$ corresponds to the fuzzy variable D3 (highest danger coefficient), all the route voting results PA indicate B no matter which of the fuzzy variables that represents the road curvature value K is corresponded. Hence, a deceleration is executed. When the road curvature value K corresponds to the fuzzy variable LL (the maximum curvature), the route voting results PA respectively indicate RB, B, and LB when the fuzzy variables LD2, D3, and RD2 which have higher danger coefficients among all the fuzzy variables that represent the obstacle feature sliding surface $S_i$ are corresponded. Hence, a deceleration is executed when travelling around a curve having a larger curvature.

According to the above-mentioned embodiments, it is understood that the present invention sliding mode trajectory voting strategy module and the driving control system and the method thereof have the following advantages:

1. The number of calculation parameters in the trajectory voting strategy unit is reduced by utilizing sliding mode control theory so as to greatly reduce the number of fuzzy operation rules. As a result, the operating time required by the overall system is reduced so that the overall system reacts more rapidly.

2. The numerical values calculated by the trajectory voting strategy unit comprises not only the road surface information, the obstacle information, the climate information, and the dynamic information for vehicle but also the driver's operation information so as to provide a semi-automatic/automatic intelligent drive system.

3. In addition, all the information or numerical values transmitted between the environmental numerical information sensor fusion unit, the driving behavior detection unit, the road curvature generating unit, the road risk assessment unit, the trajectory voting strategy unit, and the driving behavior command generating unit can be backed up, and a recollection action can be performed in conjunction with routes on a map. When the target vehicle passes through the same route, the sliding mode driving control system can use the data stored in the real-time storage unit to save the computing time that would otherwise be spent.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A sliding mode trajectory voting strategy module comprising:
    a fuzzification interface inputting a road curvature information and a road risk assessment information and performing a fuzzy analysis based on a plurality of predetermined membership functions;
    a fuzzy inference interface integrating the road curvature information and the road risk assessment information based on a sliding mode control theory and performing a simulation on the road curvature information and the road risk assessment information to obtain a route voting result; and
    a defuzzification interface defuzzifing the route voting result according to a fuzzy logic rule table to obtain an orientation angle of a safe path;
    wherein the sliding mode control theory is utilized to integrate a reaction time and a relative distance in the road curvature information and the road risk assessment information into an obstacle feature sliding surface, the obstacle feature sliding surface $S_i=\text{sign}(Y_i)(\tau_i+\lambda d_i)$, wherein $\tau$ represents the reaction time, $\lambda$ represents an obstacle feature constant, d represents the relative distance, Y represents a horizontal coordinate of a target obstacle, and the subscript i represents the target obstacle.

2. The sliding mode trajectory voting strategy module of claim 1, wherein each of the predetermined membership functions is a triangle equation.

3. The sliding mode trajectory voting strategy module of claim 1, wherein the fuzzy inference interface uses a road curvature value and the obstacle feature sliding surface as antecedents of a fuzzy rule, and uses the orientation angle of the safe path as a consequent of the fuzzy rule, the road curvature value K=1/r, wherein r is a curvature radius of a road.

4. The sliding mode trajectory voting strategy module of claim 3, wherein the road curvature information comprises lateral motion and longitudinal motion of the target vehicle, and the road risk assessment information comprises an obstacle feature, a road feature, and a human-vehicle interaction feature.

* * * * *